United States Patent [19]

Ishi et al.

[11] Patent Number: 5,991,243
[45] Date of Patent: *Nov. 23, 1999

[54] DATA PLAYBACK DEVICE TO CONTROL A LASER ILLUMINATING POSITION BY COMPARING PHASE OF A LASER DRIVE SIGNAL AND A LASER TRACKING ERROR DETECTION SIGNAL

[75] Inventors: Yuwa Ishi, Yokohama; Hiroyuki Oshikiri, Tokyo, both of Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/770,642

[22] Filed: Dec. 19, 1996

[30] Foreign Application Priority Data

Dec. 20, 1995  [JP]  Japan .................................. 7-331351

[51] Int. Cl.$^6$ ........................................................ G11B 7/00
[52] U.S. Cl. ................................. 369/32; 369/47; 369/54
[58] Field of Search .............................. 369/44.26, 44.28, 369/44.29, 54, 47, 58, 60, 275.1, 275.3, 275.4, 44.25, 32

[56] References Cited

U.S. PATENT DOCUMENTS

| | | | |
|---|---|---|---|
| 4,423,502 | 12/1983 | Dil ........................................... | 369/275 |
| 4,817,068 | 3/1989 | Yamauchi ................................ | 369/30 |
| 4,858,218 | 8/1989 | Takagi et al. ........................... | 369/109 |
| 5,199,022 | 3/1993 | Suzuki et al. ........................... | 369/275.1 |
| 5,335,214 | 8/1994 | Matoba et al. .......................... | 369/44.28 |
| 5,444,682 | 8/1995 | Yamada et al. ......................... | 369/44.26 |
| 5,448,551 | 9/1995 | Miyagawa et al. ..................... | 369/271 |
| 5,459,705 | 10/1995 | Matoba et al. .......................... | 369/44.28 |
| 5,504,725 | 4/1996 | Katsumata ............................... | 369/44.28 |
| 5,508,995 | 4/1996 | Moriya et al. .......................... | 369/275.4 |
| 5,513,155 | 4/1996 | Kim et al. ............................... | 369/44.28 |
| 5,566,141 | 10/1996 | Yamaguchi et al. .................... | 369/44.28 |
| 5,568,461 | 10/1996 | Nishiuchi et al. ....................... | 369/44.26 |

FOREIGN PATENT DOCUMENTS

| | | |
|---|---|---|
| 0 559 449 A3 | 9/1993 | European Pat. Off. . |
| 0 570 235 A3 | 11/1993 | European Pat. Off. . |
| 0 626 679 A2 | 11/1994 | European Pat. Off. . |
| 0 628 952 A2 | 12/1994 | European Pat. Off. . |
| 5-282705 | 10/1993 | Japan . |

OTHER PUBLICATIONS

Technical Digest, *Higher Density Optical Recording Technologies and Their Application*, Jul. 11–13, 1994, all pages.

*Primary Examiner*—Thang V. Tran

[57] ABSTRACT

A data playback device includes a laser to produce light to illuminate a disk form of data recording medium and to playback data stored on the disk, the data being recorded on the disk in a first group of data tracks and a second group of data tracks, which exist in concentric or spiral form, wherein the first group of tracks and the second group of tracks exist with a mutual difference in level in the radial direction in the disk form of data recording medium. The data playback device further includes a rotary device to rotate the recording medium, a tracking control unit to cause the illumination location of the laser light to follow the first group of tracks or the second group of tracks, and a setting unit to set the control condition in the tracking control unit for tracking with respect to the first group of tracks or for tracking with respect to the second group of tracks. The data playback device maintains the setting in the setting unit in a control condition which has been set with respect to the track last played back.

4 Claims, 6 Drawing Sheets

DATA PLAYBACK DEVICE TO CONTROL A LASER ILLUMINATING POSITION BY COMPARING PHASE OF A LASER DRIVE SIGNAL AND A LASER TRACKING ERROR DETECTION SIGNAL

CROSS REFERENCE TO RELATED APPLICATIONS

This application is based upon and claims priority from Japanese Patent Application No. 07-331351 filed Dec. 20, 1995, the contents of which are incorporated herein by reference.

BACKGROUND OF THE INVENTION

1. Field of the Invention

The present invention relates to a data playback device in order to playback data recorded on a data recording medium, such as an optical disk and the like.

2. Description of the Related Art

A playback device for a compact disk (CD) is an example of a known data replay device.

Figure 9:
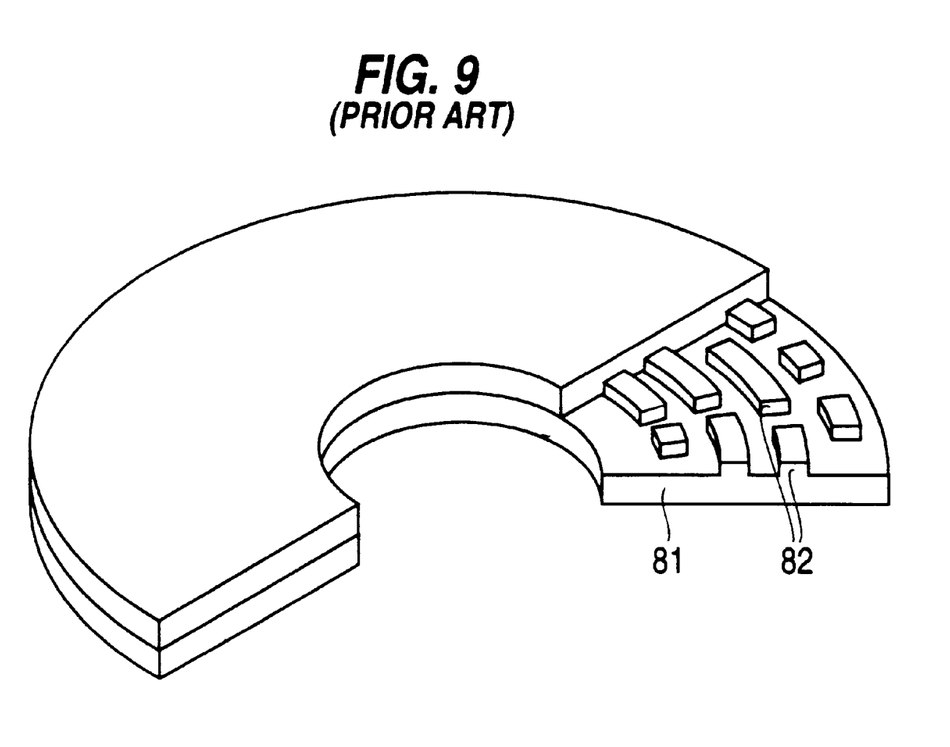
FIG. 9 is a diagram showing the constitution of a known compact disk (CD).

FIG. 9 is a diagram showing the constitution of a CD. As shown in FIG. 9, a CD has a spiral array of phase pits 82 of relief form in a transparent substrate 81 of thickness 1.2 mm. This is a data track. Voice data is then recorded by causing voice data to correspond to the length of the phase pits.

When the data recorded on a CD is played back in a playback device, first, the CD is rotated. By using an illuminating light beam, a light spot of smaller radius than the phase pits is then formed on the record tracks. Data is then replayed by detecting the diffraction state of the reflected light of the light spot on the record track.

When the light spot is in a position with no phase pit, all of the reflected light from the record track returns to the playback head. Because of this, a data detector built into a playback head of a playback device detects a large value. When a phase pit is in the position of the light spot, the light reflected from the record track is diffracted by the phase pit. Because of this, a portion of the reflected light is reflected to the exterior and does not return to the playback head. The remaining portion of the reflected light returns to the playback head. Namely, when a phase pit is in the position of the light spot, the data detector built into the playback head detects a small value.

Generally, the radius of the light beam from the playback head can be narrowed down to the diffraction limit. Because of this, when a data playback head is used with a built-in laser light source having a wavelength of 830 nm, the radius of the light spot illuminating the data track can be narrowed down to 1 $\mu$m or less. Accordingly, the pitch of the data tracks can be 1.6 $\mu$m, and a large amount of data can be recorded.

Examples of other data playback devices are magnetooptical disk devices or phase change disk devices.

The playback principle of these devices, except for using the Kerr rotation effect or the reflectivity change effect of the light reflected from the data recording medium, is the same as that of the CD playback device, and a detailed description is omitted.

The demand for recording more data on a data recording medium is very high. In response to this demand, it was generally proposed by the inventors and in their investigations to make the playback beam diameter smaller by making the wavelength of the light source of the playback head short.

However, there are limitations on the wavelength of the light source of the playback head. That is, the wavelength cannot be made infinitely short. On the other hand, when the size of the playback beam is fixed and the tracks are narrowed, the light spot due to the playback beam also illuminates record pits of the adjacent tracks. As a result, a problem was that data of the adjacent tracks was also read out, in addition to the data of the subject playback track.

Consequently, a data playback device is required which can play back only the data from the subject track, suppressing data readout from adjacent tracks.

An important result of the inventors' investigations was the discovery of the land/groove playback method as a countermeasure to suppress data readout from adjacent tracks. The tracks of magnetooptical and the like recording media are generally formed as grooves in concentric circles or spirals. Accordingly, convex portions and concave portions exist on the record surface. In the recording media heretofore, data were recorded on either the convex or the concave portions. In contrast to this, in the land/groove playback method, disks are used on which data has been recorded on both the convex portions (lands) and the concave portions (grooves).

This is a superior method, because the track pitch can be practically halved. The results in suppressing data readout from adjacent tracks by the land/groove method have been described in the following literature and references, and a detailed description will be omitted here.

Technology in relation to phase change disks is mentioned in "High Density Phase Change Disks By Land & Groove Recording" (Fifth Phase Change Recording Research Society Symposium, Collected Papers"). Moreover, technology related to magnetooptical disks is described in "Crosstalk Analysis of Land/Groove Magnetooptical Recording" (Symposium on Optical Memory 1994).

Furthermore, the present assignee's Japanese patent applications 6-190695, 6-215137, and 6-215138 also describe the effect of suppressing data readout from adjacent tracks in land/groove playback methods. Nevertheless, because there exist two kinds of tracks, land tracks and groove tracks, in this land/groove playback method, data could not be freely played back from optional tracks by the prior art technology.

For example, when playing back data from a recording medium, by causing the light spot to move relatively, the data recorded on the data track is played back in succession. Specifically, in playing back a CD, in the state in which the disk is caused to rotate, the illumination position of the light spot is controlled such that the light spot is normally on the data track. This kind of control is called tracking control.

The tracking control mechanism in prior art devices could only correspond to tracking with respect to either one of land tracks or groove tracks, not both. The reason for this is that, because the tracking characteristics differ in land tracks and groove tracks, when tracking control is matched to the track characteristics of one kind, i.e., land or groove tracks, tracking control is not suitable for the tracking control of the other kind of tracks, groove or land tracks.

SUMMARY OF THE INVENTION

Accordingly, it is an object of the present invention to resolve the problems noted above, and to provide a data playback device which can easily perform tracking control with respect to both land and groove tracks.

Objects of the present invention are achieved by a data playback device comprising a laser to produce light to illuminate a disk form of data recording medium and to playback data stored on the disk, the data being recorded on the disk in a first group of data tracks and a second group of data tracks, which exist in concentric or spiral form, wherein the first group of tracks and the second group of tracks exist with a mutual difference in level in the radial direction in the disk form of data recording medium, a rotary device to rotate the recording medium, a tracking control unit to cause the illumination location of the laser light to follow the first group of tracks or the second group of tracks, and a setting unit to set a control condition in the tracking control unit for tracking with respect to the first group of tracks or for tracking with respect to the second group of tracks, wherein the data playback device maintains the setting in the setting unit in the control condition which has been set with respect to the track last played back.

Other objects of the present invention are achieved by a data playback device comprising a laser to produce light to illuminate a disk form of data recording medium and to playback data stored on the disk, the data being recorded on the disk in a first group of data tracks and a second group of data tracks, which exist in spiral form, wherein the first group of tracks and the second group of tracks exist with a mutual difference in level in the radial direction in the disk form of data recording medium, a rotary device to rotate the recording medium, and a tracking control unit to cause the illumination location of the laser light to follow the first group of tracks or the second group of tracks, wherein the tracking control unit, in the case that the illumination position of the laser light overshot the track last played back, causes the illumination position of the laser light to move in a direction towards the track last played back.

Still further objects of the present invention are achieved by a data playback device comprising a laser to produce light to illuminate a disk form of data recording medium and to playback data stored on the disk, the data being recorded on the disk in a first group of data tracks and a second group of data tracks, which exist in concentric or spiral form, wherein the first group of tracks and the second group of tracks exist with a mutual difference in level in the radial direction in the disk form of data recording medium, a rotary unit to rotate the recording medium, and a tracking control unit to cause the illumination location of the laser light to follow the first group of tracks or the second group of tracks, a detection unit to detect that the illumination position of the laser light has deviated from the track last played back, and a movement unit to return the illumination position of the laser light to the track last played back, according to a detection output from the detection unit.

Yet further objects of the present invention are achieved by a data playback device comprising a laser to illuminate an optical disk with laser light, the disk having data recorded thereon in a plurality of spiral or concentric tracks, a tracking control circuit to control tracking of the laser light on the optical disk and to generate a tracking error signal, wherein the optical disk includes land tracks and groove tracks disposed from an inner circumference to an outer circumference thereof in an alternating manner, and wherein, when the laser light is over a land track and when the laser light is passing over a groove track, the polarity of the tracking error signal is reversed.

Still further objects of the present invention are achieved by a data playback device comprising a laser to produce laser light to illuminate a disk form of recording medium, which has data recorded thereon in at least one of land tracks and groove tracks that are formed in one of a spiral or concentric form, a tracking actuator to move the laser along the land tracks or groove tracks, a land track control circuit and a groove track control circuit to control the tracking actuator such that a level of a tracking signal output by the land track control circuit and the grove track control circuit is zero when the laser light is on a groove track or a land track.

Further objects of the present invention are achieved by a method of data playback comprising illuminating with laser light a disk form of recording medium having land tracks and groove tracks formed thereon in one of a spiral and concentric form, rotating the disk form of recording medium, maintaining the laser light on one of the land tracks and the groove tracks to read data therefrom, detecting whether an illumination position of the laser light has deviated from the track last played back, and moving a movement unit to return the illumination position of the laser light to the track last played back, according to the detecting.

BRIEF DESCRIPTION OF THE DRAWINGS

These and other objects, features, and characteristics of the present invention along with the method of use will become clear to one skilled in the art by reading the following detailed description with reference to the appended claims and drawings, all of which form a part of this specification. In the drawings:

DETAILED DESCRIPTION OF THE PREFERRED EMBODIMENTS

Reference will now be made in detail to the presently preferred embodiments of the present invention, examples of which are illustrated in the accompanying drawings.

Figure 2:
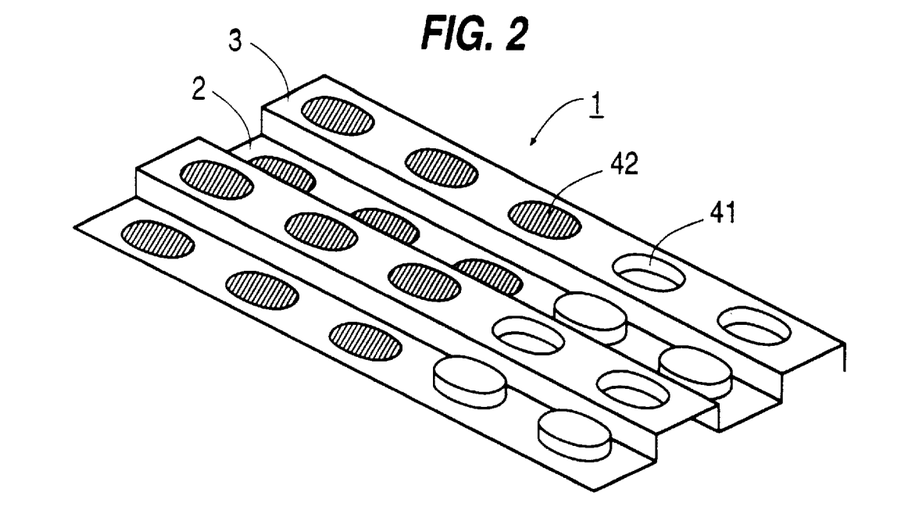
FIG. 2 is a diagram showing the track structure of a data recording medium used in the data playback device according to the preferred embodiment of the present invention.

FIG. 2 is a diagram showing the track structure of a data recording medium which is used in a data playback device according to an embodiment of the present invention. FIG. 2 shows the structure of the recording tracks of a disk form recording medium. There are land tracks 3 and groove tracks 2 in disk form recording medium 1. The respective difference in level is about $1/7 \lambda$, where $\lambda$ is the wavelength of the light beam which illuminates these tracks for playback.

In the respective tracks, there are regions in which data is recorded by phase pits 41, and regions in which data is recorded by magnetooptical pits 42. Address data is recorded in the regions in which data is recorded by phase pits, and data including the recording subject (data for user use) is recorded in the regions in which data is recorded by magnetooptical pits.

Figure 3:
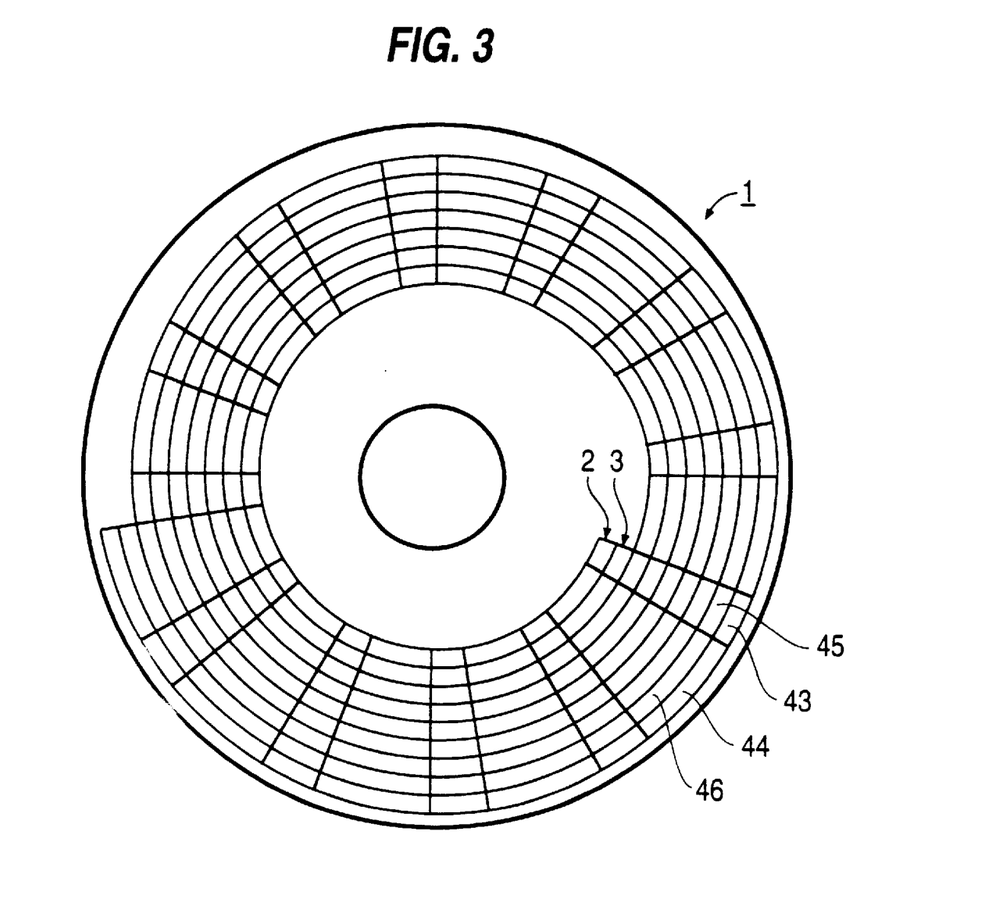
FIG. 3 is a diagram showing the constitution of a data recording medium used in a data playback device according to the preferred embodiment of the present invention.

FIG. 3 is a diagram which shows the track shape of a data recording medium used in a data playback device according to an embodiment of the present invention.

Land tracks 3 and groove tracks 2 are alternately side by side in a radial direction on the recording surface of the disk form recording medium 1. The respective tracks form spirals. Namely, two spiral tracks are formed, convex and concave. Moreover, the land tracks and groove tracks may be made concentric, alternately formed in the radial direction.

In the case of spiral form tracks, the land track 3 and the groove track 2 are respectively formed as one continuous track from the outermost circumference to the innermost circumference, but one circuit of the disk is considered as one track. As shown in FIG. 3, each track is constituted by address portions 43, 45 and data recording portions 44, 46. A set of a continuous address portion and data recording portion is called a sector (for example, the set of address portion 43 and data recording portion 44). In a track, plural sectors are arrayed in a continuous row in the track direction. The address portions 43, 45 are recorded with address data by phase pits. Moreover, in the data recording portions 44, 46, data used by the user is recorded by magnetooptical pits.

The track address and sector address are recorded in the address portion of each sector. The track addresses are set up in succession from the innermost circumferential track, in ascending order. Moreover, the same track address is recorded in each sector of one track (one circuit).

For example, setting the track address of the innermost circumferential track (land track) as "1", the track address of the track one outward from this (groove track) is set as "2". Thereafter, going in the outward direction, the track addresses are set as "3", "4", "5", . . . . If each track is given an address in this manner, the odd numbered addresses come to denote land tracks, and the even numbered addresses denote groove tracks.

The difference in level of the land tracks and groove tracks is set at a value which has the effect of suppressing reading out of adjacent tracks. This value is in general about $1/7 \lambda$ ($1/7$ of the wavelength, $\lambda$, of the illuminating light beam), but to some degree there are differences between CDs, magnetooptical disks, phase change disks and the like. Namely, with a wavelength of 830 nm for the illuminating light beam, in the case that a transparent plate of index (refractive index) 1.5 was used, a difference in level of 80 nm is preferable.

The properties of the data pits are set to a value which is effective in suppressing the readout of adjacent tracks. This value differs according to the kind of disk: CDs, magnetooptic disks, phase change disks, and the like.

For example, for a CD, a phase difference of $1/4 \lambda$ is preferable. Moreover, in magnetooptical disks, it is preferably set as a complex Kerr rotation angle $\theta k=0°$. Namely, if it is a magnetooptical disk, the data pits may be set as magnetooptical pits of Kerr rotation angle $\theta k=1°$, complex Kerr rotation angle $0°$.

As shown in FIG. 2, in this embodiment, the width of the land tracks and groove tracks in the radial direction of the disk is the same. The track pitch is set such that, when the playback beam illuminates the center of a land track, the playback beam does not illuminate the adjacent land tracks.

Proceeding in this manner, when the playback beam illuminates the center of a groove track, the playback beam does not illuminate the adjacent groove tracks. At this time, it does not matter if the playback beam which has illuminated a land track illuminates an adjacent groove track, or if the playback beam which has illuminated a groove track illuminates an adjacent land track.

Figure 1:
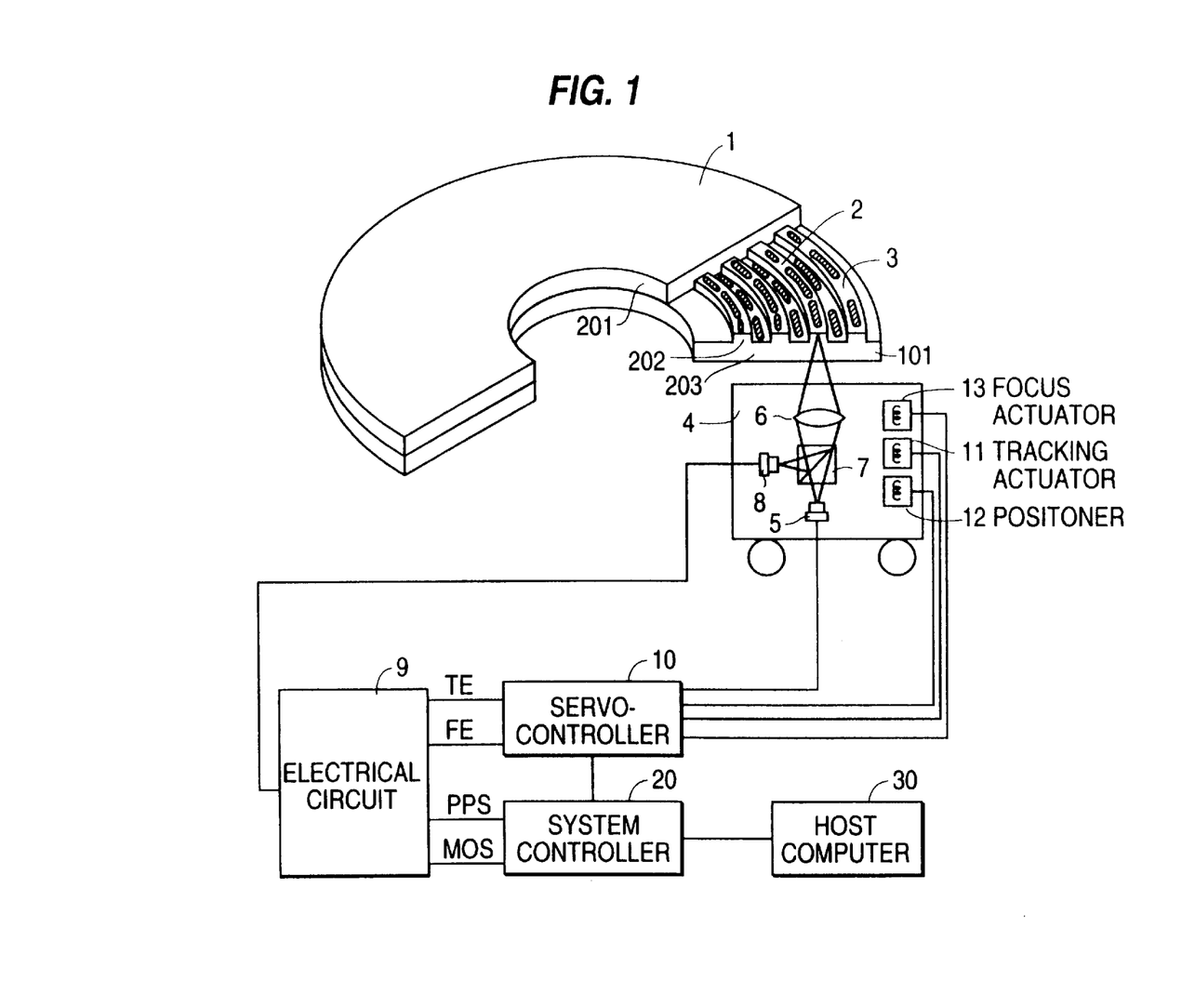
FIG. 1 is a diagram showing the constitution of a data playback device according to a preferred embodiment of the present invention.

Namely, in the case of a wavelength of 830 nm of the illuminating light beam, and a numerical aperture NA=0.55 of the objective lens of the optical head of the data playback device, the track pitch from the land track to an adjacent groove track may be 800 nm. FIG. 1 is a diagram showing the constitution of a data playback device according to an embodiment of the present invention. The disk form recording medium 1 rotates at, for example, 1,800 rpm due to a spindle motor (not shown in the drawing).

There are land tracks 3 and groove tracks 2 in the disk form recording medium 1. The respective difference in level between the land tracks and groove tracks becomes about $1/7$ $\lambda$ ($\lambda$ is the wavelength of the illuminating light beam). A reflective layer including metal (aluminum or the like) is formed in the surface 203 of the substrate 201.

Moreover, seen from the illumination direction of the light beam, the tracks which become convex portions are called land tracks, and the tracks which become concave portions are called groove tracks.

The disk form recording medium 1 is a magnetooptical disk. The land tracks 3 and groove tracks 2 record data by magnetooptical pits and phase pits. A protective film 202, which covers the recording surface on which data has been recorded, includes a macromolecular material.

Optical head 4 is used to play back the data recorded on the recording medium 1 and is constituted as follows. A light beam emitted from a semiconductor laser 5 in the optical head 4 passes through a beam splitter 7 and is focused by an objective lens 6, forming a light spot on a track surface of the recording medium 1. The light reflected from the track surface again passes through the objective lens 6, is reflected in the beam splitter 7, and is incident on a detector 8. Detector 8 is a photoelectric converter, for example, a photodiode.

The reflected light is converted by the detector 8 into an electrical signal, which is input to an electrical circuit 9. The electrical circuit 9 processes the electrical signal from the detector 8, and outputs a tracking error signal (TE), a focus error signal (FE), a phase pit signal (PPS), and a magnetooptical signal (MOS).

The tracking error signal TE is a signal which shows the amount of displacement of the light spot formed on a track of the disk form recording medium 1 from the center line of the track in the radial direction. The focus error signal FE is a signal which shows the amount of displacement of the focus point position of the light beam from the track surface. The phase pit signal PPS is a playback signal of data recorded by phase pits on the track. The magnetooptical signal MOS is a signal of data recorded by magnetooptical pits on the track.

The tracking error signal TE and the focus error signal FE are input to a servo-controller 10, which processes the signals, converts them to a tracking signal, a positioning signal, and a focus signal, and outputs these three signals.

The tracking signal is a signal that drives a tracking actuator 11. Furthermore, the tracking signal is a signal having a level according to the level of the tracking error signal TE (amount of displacement of the light spot formed on a track of the disk form recording medium 1 from the center line of the track in the radial direction). The tracking actuator 11 moves the objective lens 6 in the radial direction of the recording medium 1 by an amount corresponding to the level of the tracking signal. This allows the position of the light spot to be set in a position in the center of the track.

The positioning signal is a signal that drives a positioner 12. The positioner 12 moves the optical head 4 in the radial direction of the recording medium 1.

The focus signal is a signal in order to drive a focus actuator 13. The focus signal is a signal of a level corresponding to the level of the focus error signal FE (amount of displacement of the focus point position of the light beam from the track surface). The focus actuator 13 moves the objective lens 6 in a perpendicular direction with respect to the recording surface of the medium 1 by an amount corresponding to the level of the focus signal. In this manner, the light spot is caused to focus on the track surface.

On the other hand, the phase pit signal PPS and the magnetooptical signal MOS are input to the system controller 20. These signals, as data read out from the recording medium 1, are output to a host computer 30. The system controller 20 communicates with the host computer 30, and according to commands from the host computer 30, sends to the host computer 30 the data which was read out.

Furthermore, the system controller 20 forms control signals based on the phase pit signal PPS and the magnetooptical signal MOS, and sends these control signals to the servo-controller 10.

Figure 4:
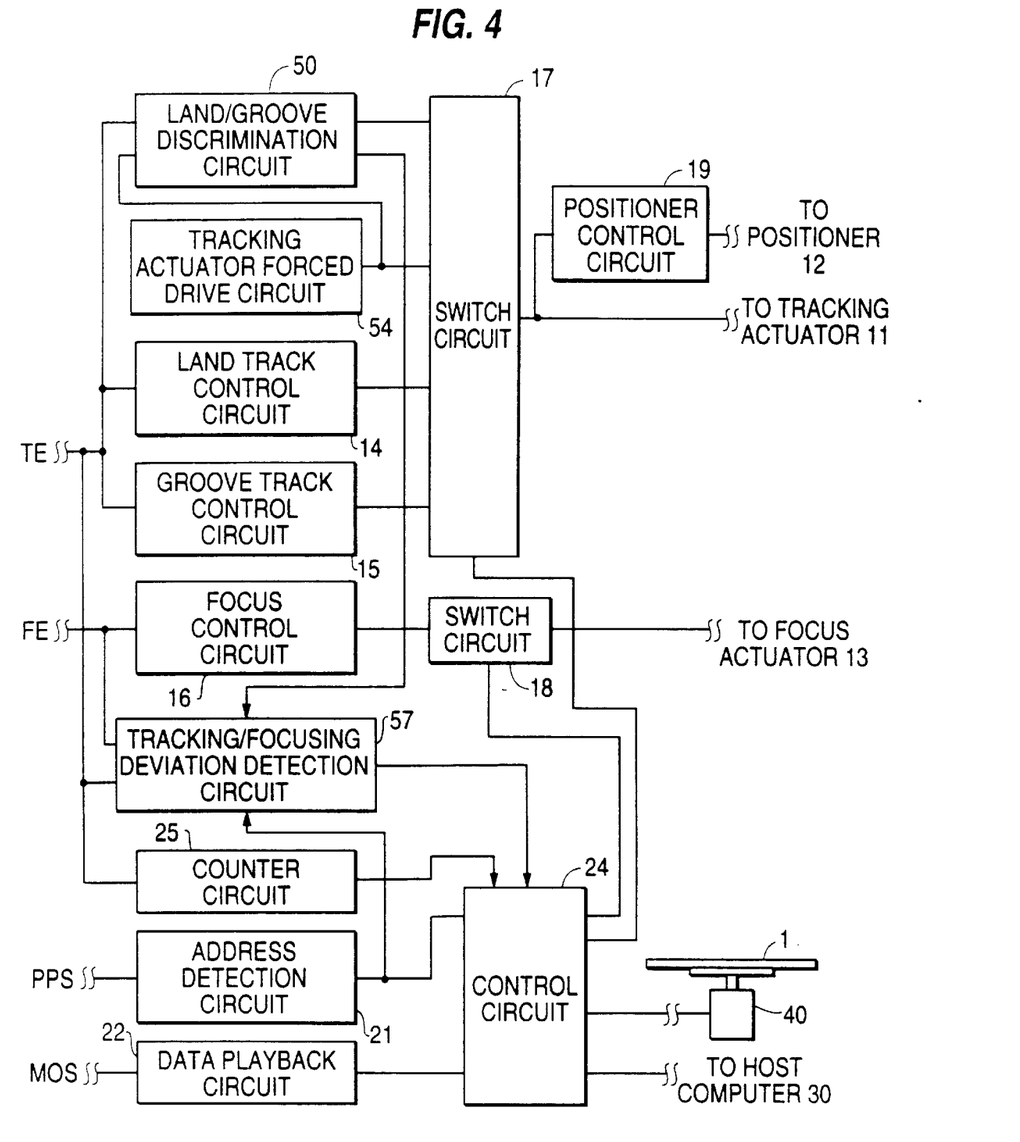
FIG. 4 is a diagram showing the constitution of a servo controller and system controller of a data playback device according to a preferred embodiment of the present invention.

FIG. 4 is a constitutional diagram of the servo-controller 10 and the system controller 20. The servo-controller 10 is constituted by a land track control circuit 14, a groove track control circuit 15, a focus control circuit 16, switch circuits 17, 18, a positioner control circuit 19, a land/groove discrimination circuit 50, and a tracking actuator forced drive circuit 54. The system controller 20 is constituted by an address detection circuit 21, a data playback circuit 22, and a control circuit 24.

The tracking error signal TE is input to the land track control circuit 14 and to the groove track control circuit 15. The output signals of the respective control circuits are of opposite polarity, with the same control constant. The switch circuit 17 receives the output signals from the land track control circuit 14, the groove track control circuit 15, and the tracking actuator forced drive circuit 54. By signals from the system controller 20 and the land/groove discrimination circuit 50, one signal from among the three input signals is then selectively output. The signal output from the switch circuit 17 is output as a tracking signal to the tracking actuator 11.

A portion of the tracking signal output from the switch circuit 17 is output as a positioning signal to the positioner 12, via the positioner control circuit 19.

The focus error signal FE controls the focus actuator 13 via the focus control circuit 16 and the switch circuit 18. The switch circuit 18 is controlled to an open state and to a closed state by signals from the system controller 20. Namely, the presence or absence of an output from the switch circuit 18 is controlled. The signal output from the switch circuit 18 is output as a focusing signal to the focus actuator 13.

The phase pit signal PPS is input to the address detection circuit 21. A signal showing address data (address signal) is detected from within the phase pit signal by the address detection circuit 21.

The address signal output from the address detection circuit 21 is sent to the tracking/focusing deviation detection circuit 57. The magnetooptical signal MOS is input to the data playback circuit 22. The magnetooptical signal MOS then becomes playback data by the data playback circuit 22. The address signal output from the address detection circuit 21, and the playback data output from the data playback circuit 22, are input to the control circuit 24. The control circuit 24 controls the switch circuit 17, based on a discrimination signal received from land/groove discrimination circuit 50 through tracking/focusing deviation detection circuit 57. Moreover, the playback data is sent to the host computer 30.

Figure 5A:
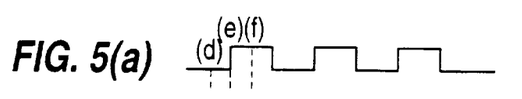
FIGS. 5(a)–5(c) are diagrams showing the changes of polarity of a tracking error signal of a data playback device according to a preferred embodiment of the present invention.
Figure 5B:
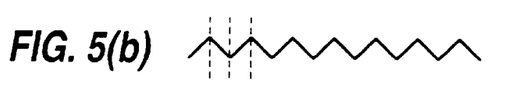
Figure 5C:
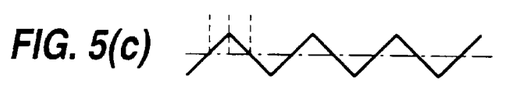

FIGS. 5(a)–5(c) are diagrams showing changes in the tracking signal.

FIG. 5(a) shows the time change of the tracking error signal detected when the optical head 4 is caused to move in the radial direction from the inner circumferential side to the outer circumferential side.

In FIG. 5(a), the portion labelled with symbol (d) indicates when the light spot is passing through a land track. The portion labelled with the symbol (e) indicates when the light spot is passing through the boundary between a land track and a groove track. The portion labelled with the symbol (f) indicates when the light spot is passing through a groove track.

FIG. 5(b) shows the changes in reflectivity. The reflectivity is the ratio of the amount of light received by the detector 8 with respect to the amount of illuminating light. Comparing when the light spot passes over a land track and when the light spot passes over a groove track, the reflectivity falls when the light spot passes over a boundary of a land track and a groove track.

FIG. 5(c) shows the waveform of the tracking error signal when a push-pull method has been used in tracking error detection. When the light spot is passing over a land track, the slope of the change of the tracking error signal level with time is positive. Namely, there is a monotone increase of level. Moreover, when passing over a groove track, the slope of the change of the tracking error signal level with time is negative.

As can be seen from FIGS. 5(a)–5(c), when the light spot is passing over a land track, and when it is passing over a groove track, the polarity of the tracking error signal becomes reversed. The tracking signal output from the land track control circuit 14 and the groove track control circuit 15 selectively pass through switch circuit 17 to form a signal to control the tracking actuator such that the level of the tracking error signal becomes 0. When the light spot is on a land track and when it is on a groove track, the polarity of the tracking error signal becomes reversed; if the polarity of the tracking signal is also reversed, the tracking control of the respective track becomes well performed. Accordingly, in this embodiment, the output of the land track control circuit 14 and the output of the groove track control circuit 15 reverse in polarity as the light spot passes over each respective track.

The operation of the data playback device of this embodiment will next be described. First, a recording medium is inserted into the data playback device. The control circuit 24, by sending control signals to the spindle motor 40 (see FIG. 4), starts the spindle motor 40 rotating, and rotates the recording medium 1 located on the turntable. The playback device detects whether or not the inserted recording medium 1 is a land/groove recording medium.

This detection can be performed in the following manner. The data recording medium 1 is housed in a case. A sensor hole is arranged in a portion of this case. The replay device, when the recording medium is inserted, detects the sensor hole in the case. If the playback device detects the sensor hole, the playback device can recognize that the inserted recording medium is a land/groove recording medium.

Alternatively, a mark may be placed in the recording surface of the data recording medium, which indicates that it is a land/groove recording medium. For example, generally in the recording surface of a magnetooptical disk, is a so-called PEP (position modulation portion). Various data relating to the medium are recorded here, and data may be recorded in this region to show that it is a land/groove recording medium. Moreover, data showing that it is a land/groove recording medium may also be recorded in predetermined regions of other predetermined tracks.

The playback device, when a recording medium is inserted, causes the recording medium to rotate at a predetermined speed by the spindle motor. Next, the playback device, driving the focus actuator 13 of the optical head 4, performs focus pulling control with respect to an optional track of the recording medium. This focus pulling control, by using the output of control signals from a control circuit 24 in the system controller 20, is performed by the switch circuit 18 going into the closed state. When the switch circuit 18 goes into the closed state, the focusing signal from the switch circuit 18 is output to the focus actuator 13. The light spot is then focused on the track surface by the operation of the focus actuator 13.

When this kind of focus pulling control is performed, the switch 17 is placed open. Namely, signals from any of the land track control circuit 14, the groove track control circuit 15, and the tracking actuator forced drive circuit 54 are placed such that they are not output to the tracking actuator 11. This state includes a tracking servo loop open (servo OFF) state.

Performing focus pulling control, and thus causing the light beam to be focused, the control circuit 24 controls the switch circuit 17, closing the switch circuit 17 to the tracking actuator forced drive circuit 54. As a result, signals are output from the tracking actuator forced drive circuit 54 to the tracking actuator 11, and the tracking actuator 11 operates based on the signals from the tracking actuator forced drive circuit 54.

Figure 6A:
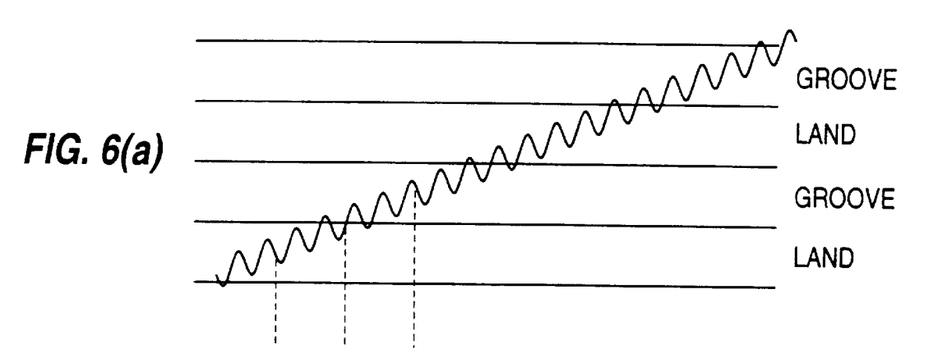
FIGS. 6(a)–6(c) are diagrams describing the method of discriminating whether the track illuminated by a light beam is a land track or a groove track, from the changes of polarity of a tracking error signal of a data playback device according to a preferred embodiment of the present invention.
Figure 6B:
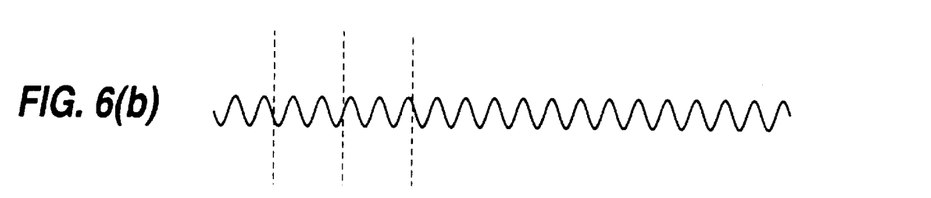
Figure 6C:
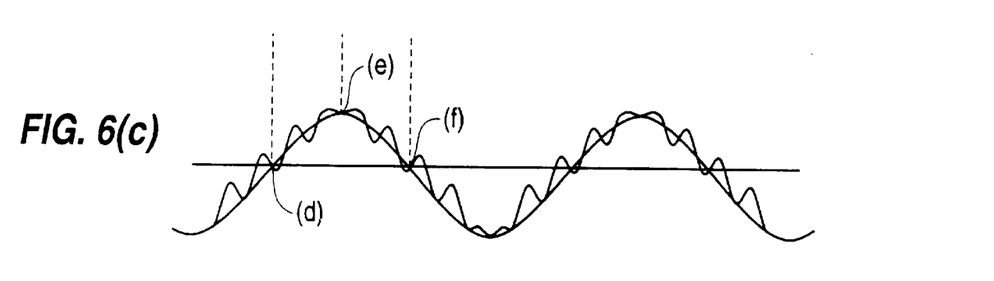

FIGS. 6(*a*)–6(*c*) are diagrams showing a method of discriminating, from the change of polarity of the tracking error signal, whether a track illuminated by the light beam is a land track or a groove track.

FIG. 6(*b*) illustrates the drive signal, i.e. current of the tracking actuator 11, which is an output signal from the tracking actuator forced drive circuit 54. FIG. 6(*a*) is a diagram showing the change of the illumination position of the light beam accompanying the passage of time. In this case, because the tracking servo is set ON, the absolute position of the light spot only oscillates in the radial direction, based on the drive signal from the tracking actuator forced drive circuit 54. However, because the tracks of the disk 1 have eccentricity, the relative position of the light spot and the track of the disk 1 displaces in the radial direction due to the rotation of the disk 1. Accordingly, as shown in FIG. 6(*a*), the illumination position of the light beam does not continue to shine on the same track, but according to circumstances is displaced to an adjacent track.

FIG. 6(*c*) depicts the waveform of the tracking error signal when a push-pull method has been used in tracking error detection. This waveform becomes a waveform in which the oscillation, shown in FIG. 6(*b*), of the light beam illumination position due to the changing drive signal is superposed on a sine wave which arises due to the illumination position of the light beam crossing the tracks.

In FIG. 6(*a*), when the light beam is in motion on a land track and when the drive signal shown in FIG. 6(*b*) is reduced, the level of the tracking error signal shown in FIG. 6(*c*) is also reduced as indicated by symbol (d). Moreover, in FIG. 6(*a*), when the light beam is in motion on a groove track, and when the drive signal shown in FIG. 6(*b*) is reduced, the level of the tracking error signal shown in FIG. 6(*c*) increases as indicated by symbol (f). Moreover, when the light beam moves on the boundary of a land track and a groove track, the tracking error signal shown in FIG. 6(*c*) does not change in level as indicated by symbol (e).

From the above, it is clear that, when the light beam illuminates a land track, and when the light beam illuminates a groove track, the change of the drive signal of the tracking actuator 11 with respect to direction of the change of the level of the tracking error signal become reversed. Accordingly, from this relationship it can be discriminated whether the track which is illuminated by the light beam is a land track or a groove track.

Figure 7:
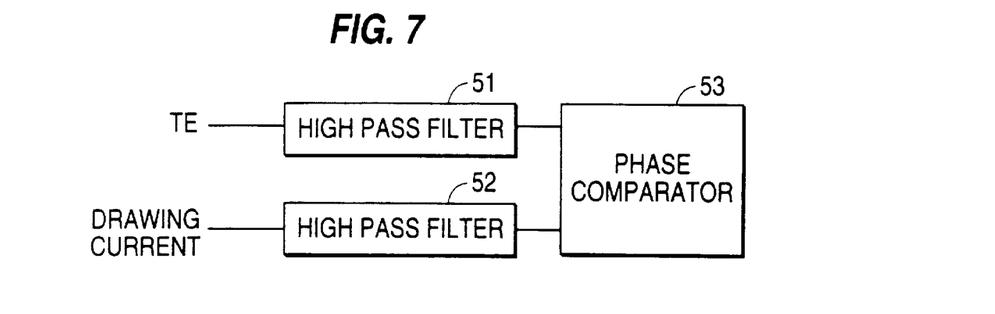
FIG. 7 is a diagram showing the constitution of a land/groove discrimination circuit according to a preferred embodiment of the present invention.

FIG. 7 is a diagram showing a constitutional example of a land/groove discrimination circuit 50. In FIG. 7, a tracking error signal (the signal of FIG. 6(*c*)) is input to a high pass filter 51, and the signal from the actuator forced drive circuit 54 (the signal of FIG. 6(*b*)) is input to a high pass filter 52. The respective high pass filters eliminate the low frequency signals, which are unnecessary for discrimination, from the input signals. The output signals from the high pass filters 51 and 52 are input to a phase comparator 53. The phase comparator 53 outputs a signal showing a positive value when the two input signals are the same in phase, and outputs a signal showing a negative value when the two input signals are of opposite phase. Accordingly, in this embodiment, when a signal showing a positive value is output from the land/groove discrimination circuit 50, the illumination position of the light beam is on a land track, and when a signal is output showing a negative value is output, the illumination position of the light beam is on a groove track.

In the above manner, according to the discrimination signal of the land/groove discrimination circuit 50, the switch circuit 17 from the tracking actuator forced drive circuit 54 is selectively closed to either the land track control circuit 14 or the groove track control circuit 15 side. When the land/groove track discrimination circuit 50 outputs a signal showing a positive value, switch circuit 17 is closed to the land track control circuit 14, and when the output signal shows a negative value, switch circuit 17 is closed to the groove track control circuit 15.

As a result, a tracking signal according to the track on which the light spot is positioned is output to the tracking actuator 11, and tracking control is commenced. The light spot can then continue to follow the track (land track or groove track) on which it has been focused. For example, when the discrimination signal from the land/groove discrimination circuit 50 is one showing a land track, the tracking conditions are set corresponding to a land track. Service control of the tracking with respect to a land track is then performed.

This control is performed by the switch circuit 17 being connected to the output from land track control circuit 14 side. As a result, from switch circuit 17, a tracking signal is output whose polarity is suited to tracking control of land tracks. The tracking signal is sent to the tracking actuator 11. The tracking actuator 11 performs service control of the tracking with respect to a land track, and the light spot thereafter continues to follow this land track.

By the above operation, the light spot undergoes tracking control and focus control with respect to a land track. The light spot then continues to follow this land track, and continues to undergo focus control on the land track surface.

In this state, in which a light spot has followed a land track, an instruction is awaited from host computer 30 which is located outside the playback device. A predetermined data readout instruction is then received from the host computer 30. This instruction is input to the control circuit 24 within the system controller 20. The control circuit 24 determines whether the sector which received the readout instruction exists in a land track, or whether it exists in a groove track. The control circuit 24 then finds the difference of the relative position of the present head position (present track) and the position of the sector (target track) received from the read in instruction.

The control circuit 24 sets the tracking servo to open loop (servo OFF). This control to opens switch circuit 17, so that no tracking signals are output from the switch circuit 17.

The control circuit 24 next performs control which causes movement of the optical head 4 in the direction of the target track, by sending control signals to the positioner control circuit 19. During the movement of the optical head 4, a tracking error signal is output as shown in FIG. 5(*a*). A counter circuit 25 counts the number of pulses of this tracking error signal. The value of this count is input to the control circuit 24. The number of tracks that the light spot crosses is known from this count value. The control circuit 24 stops the movement of the optical head 4 when just the number of tracks to the target track have been crossed (when the position of the light spot is exactly over the target track), and sets the tracking servo to closed loop (servo ON). Stopping of the movement of the optical head 4 is performed by the control circuit 24 sending a control signal to the positioner control circuit 19. Setting the tracking servo to closed loop is performed by the control circuit 24 by controlling the switch circuit 17. At this time, if the target track is a land track, a tracking signal of a polarity appropriate for tracking control of a land track is caused to be output from the switch circuit 17. Namely, the switch circuit 17 connects to the output side from land track control circuit 14. If the target track is a groove track, a tracking signal of a polarity appropriate for tracking control of a groove track is caused to be output from the switch circuit 17. Namely, the switch circuit 17 connects to the output from groove track control circuit 15. The target track is now a groove track. The playback device plays back data from the track which the light spot followed due to the tracking control, and detects the track address. The control circuit 24 confirms that the track address which was detected is a groove track, and that the sector for which a readout instruction was received is present on the track.

In a case that the present track address is not that of a groove track, or in the case that the address of the track (target track) on which the sector was present for which a readout instruction had been received different than intended, the control circuit 24 again finds the difference of the relative position of the actual head position (present track) and the track in which the sector is present for which a readout instruction has been received (target track). The above operation is then repeated.

In a case where the present track and target track differed, the difference of the relative position is again found for the present track address and the track in which the sector is present for which a readout instruction had been received (target track). The above operation is then repeated.

Then, when there is agreement between the present track address and the track in which the sector is present for which a readout instruction has been received, the playback device plays back data of the sector for which a readout instruction has been received, and sends the read out data to the external host computer 30. This operation is performed by the control circuit 24 sending the replay data from the data replay circuit 22 to the host computer 30. There are many cases in which the sectors for which readout instructions were received are plural. It may be that these sectors are in succession on a track, but there are also cases in which this is not so. In the case they are not in succession, by repeatedly performing the above operation, the optical head may be caused to move to the tracks where the desired sectors are.

Proceeding in the above manner, when the playback has ended of all the sectors for which readout instructions were received, tracking is resumed so as to continue by following the track after that which was the subject of the last readout instruction.

After this, the playback device again awaits instructions from the host computer 30. While awaiting instructions, control is effected so as to remain in the neighborhood of the track last accessed.

This control is described below.

In the case in which a disk form recording medium was used which has a spiral track as shown in FIG. 3, when the light spot is following a given land track, for example, when the recording medium makes one revolution, the light spot moves to the adjacent (outside) land track. In the case that a groove track is followed, it moves to the adjacent groove track. Accordingly, in order to continue following the last accessed track, causing movement of the position of the light spot to the outside for each revolution of the recording medium, the light spot returns to the last accessed track.

Furthermore, there is the case in which an external disturbance and the like disturbs the tracking control, and there is a displacement from the track which the light spot was following. In this case also, the light spot is returned to the last accessed track.

Figure 8:
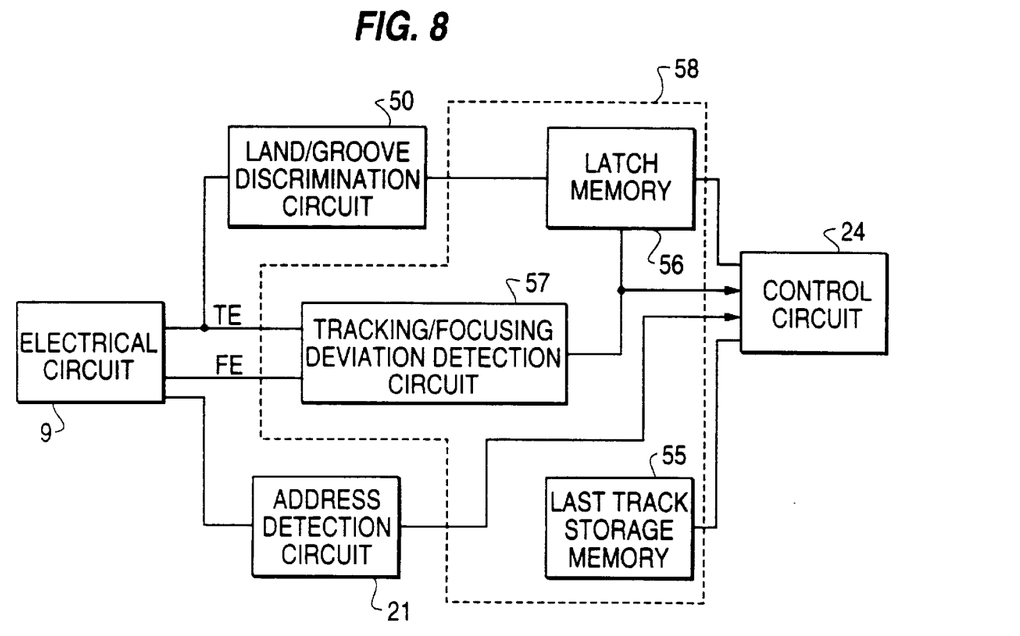
FIG. 8 is a diagram showing the constitution of a tracking control state memory circuit according to a preferred embodiment of the present invention.

In order to return to the original track in the case that, as above, the light spot was displaced from the last accessed track, in this embodiment, a tracking control state memory circuit 58 is arranged to store the address of the last accessed track (track appertaining to the sector last played back), and the condition of the tracking control corresponding to this track.

FIG. 8 is a diagram showing the constitution of the tracking control state memory circuit 58. The tracking control state memory circuit 58 is constituted by a tracking/focusing deviation detection circuit 57, a latch memory 56, and a last track storage memory 55. The tracking error signal TE and the focus error signal FE, which are output via the electrical circuit 9 from the optical head 4, are input to the tracking/focusing deviation detection circuit 57. A discrimination signal from land/groove discrimination circuit 50 is input to the latch memory circuit 56. The track address pertaining to the sector last played back is stored in the last track storage memory 55.

The tracking/focusing deviation detection circuit 57 detects, by the tracking error signal TE and focusing error signal FE which are input to it, whether the tracking control and/or the focusing control has deviated. When the tracking control has deviated, the light spot cannot follow the predetermined track. Moreover, in the case that the focusing control has deviated also, tracking control becomes impossible, and the light spot cannot follow the predetermined track.

When tracking control and focusing control are being normally performed, the levels of the tracking error signal and the focusing error signal are stably unchanged, close to 0. However, when it happens that these controls deviate, the absolute value of the level of the respective signal becomes large. Consequently, the tracking/focusing deviation detection circuit 57 may be constituted to output a detection signal when the absolute value of the tracking error signal TE or the focusing error signal FE becomes larger than a predetermined value.

The readout instructions sent from the host computer 30 to the control circuit 24 contain the address(es) of the sector(s) to be read out (plural in many cases). The control circuit 24, among the sectors to be read out, stores in the last track storage memory 55 the track address pertaining to the sector which reads out last. The control circuit 24, by controlling the switch circuit 17, positioner control circuit 19, and the like, causes movement of the light spot to the track pertaining to the sector to be read out, and reads out the data recorded in this sector. After the last sector to be read out has been read out, the tracking control and the focusing control continue unchanged with respect to this track. After this, when the light spot passes across the address portion of the sector, a PPS signal is input to the address detection circuit 21, and the address detection circuit 21 outputs address data of the sector across which the light spot passes (track address and sector address) to the control circuit 24.

However, in the case that the form of the track of the recording medium 1 is in a spiral form, even though the light spot is following a given track, when the recording medium rotates one revolution, the light spot moves to the outside track. For example, when the recording medium makes one revolution while the light spot is following a given land track, the light spot moves to the next outside land track.

When the light spot follows a track, a playback signal is output from the optical head 4. Address data of a sector (track address and sector address) on which the light spot is at present positioned is then output from the address detection circuit 21. The control circuit 24 compares the address signal from the address detection circuit 21 and the track address which is stored in the last track storage memory 55.

At the moment when the playback process has ended, the light spot continues to follow the track pertaining to the last played back sector. At this time, the track address obtained from the address detection circuit 21 agrees with the track address which is stored in the last track storage memory 55. However, when the recording medium 1 rotates, the light spot moves to the next track (in the case that it is following a land track, to the next outside land track; in the case that it is following a groove track, to the next outside groove track). As a result, the track address obtained from the address detection circuit 21 changes to the address of the track to which the light spot has moved.

The control circuit 24 compares the track address data from the address detection circuit 21 and the track address which is stored in the last track storage memory 55. In the case that the two do not agree, it is determined that the light spot has moved from the track last played back, and control is performed to return the light spot to the original track. The control which returns the light spot to the original track is described below.

If the track address data from the address detection circuit 21 does not agree with the track address which is stored in the last track storage memory 55, the control circuit 24, first, sets the tracking servo loop to open loop (servo OFF). This control may be such as to open switch circuit 17, so that no tracking signals are output from the switch circuit 17. The control circuit 24 next performs control which causes movement of the optical head 4 in the direction of the target track (in this case, the inward direction of the recording medium), by sending control signals to the positioner control circuit 19.

During the movement of the optical head 4, tracking error signals are obtained as shown in FIG. 5(c). The points at which the level of the tracking error signal of FIG. 5(c) become 0 (the instants shown by the symbols (d) and (f), termed below the "zero crossing points"), are when the light spot is passing over a land track, or over a groove track. Namely, if the number of times the light spot crosses zero are counted during the movement of the light spot in a radial direction of the recording medium, the number of tracks which the light spot crossed is known. For example, when the light spot is following a land track, in the case that the light spot is caused to move to the next inside land track, the instant of passing over the second zero crossing point from the commencement of the movement is when it has come over the next inside land track.

The counter circuit 25 inputs the tracking error signal, and counts the number of times zero crossing points are passed over. The control circuit 24 inputs the count value output from the counter circuit 25. The count of the counter circuit 25 then commences from the commencement of the movement of the optical head 4, and when the count value has become two, stops the movement of the optical head 4, and sets the tracking servo loop to closed (servo ON). Then, the light spot follows the next inside track.

If the above operation is repeated, the light spot can be made to follow the last played back track. Moreover, in the case that the recording medium has concentric circular tracks, it can continue to follow the last played back track, and the light spot does not move to another track.

On the other hand, in the case that a detection signal is output from the tracking/focusing deviation detection circuit 57, the latch memory 56 maintains the state of the discrimination signal output from the land/groove discrimination circuit 50, and the state of the detection signal, maintained thereafter, continues to be output to the control circuit 24. The detection signal from the tracking/focusing deviation detection circuit 57 is also input to the control circuit 24. In the case that a detection signal has been output from the deviation detection circuit 57, it is considered that the position of the light spot has deviated from the track which was last played back. At this time, the control circuit 24 sets the switch circuits 17 and 18 open, the focus servo and the tracking servo turn to the OFF state, and on setting the switch 17 back again to the closed state, focus pulling control is begun anew. By then performing tracking control and controlling the switch 17 based on the discrimination signal output from the latch memory 56, the light spot can be caused to again follow the same kind of track (land track or groove track) as before the tracking servo or focusing servo deviated.

While the light spot is again following a track, track address data is read out from the address detector 21. Comparing this data with the track address stored in the last track storage memory 55, if the two are different, control is performed to cause the light spot to move to the track of the track address which is stored in the last track storage memory 55.

There are many cases in which a data readout instruction from the host computer with respect to the track is directed to the last accessed sector. This is because there are many cases in which, at the time of recording, related data is recorded in successive regions. Moreover, when playing back, there are many cases in which related data is successively played back. Because of this, as in the present embodiment, if after the end of a playback operation the light spot is caused to continue to follow the track last played back, when the next playback operation commences, the probability is high that the playback operation can be commenced without causing the light spot to move. Moreover, because there is a reduction of the number of times of controlling changeover of the conditions of tracking control at the time of commencing a playback operation, it is possible to attain a higher speed and increased reliability of playback operations.

In accordance with the preferred embodiments of the present invention as described above, the track pitch of a recording medium can be made substantially half of that previously used. Accordingly, twice the amount of data can be recorded on the recording medium than previously known.

Furthermore, in accordance with the preferred embodiments of the present invention, a first group of tracks and a second group of tracks can be optionally played back. Accordingly, it can be used as a random access type of data device.

Moreover, a special constitution of the head is also unnecessary, and the cost is not increased. Moreover, as well as CD type media for playback exclusive use, it can also be applied to rewriteable types of media.

Moreover, in accordance with the preferred embodiments of the present invention, because the illumination position of laser light can be placed and halted on the last played back track or a neighboring one, there are many cases in which the laser light illumination position is not caused to move greatly on commencing the next playback operation, and there is no change in the setting of the tracking control conditions, and speeding up of the replay operation, and an increased reliability, can be attained.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A data playback device to playback data stored on a disk, the data being recorded in a first group of data tracks and a second group of data tracks and existing in spiral form such that the first group of tracks and the second group of tracks exist with a mutual difference in level in a radial direction, comprising:

a laser to playback the data stored on the disk;

a rotary device to rotate the disk;

a tracking control unit to cause the laser to follow the first group of tracks or the second group of tracks;

a memory unit to store a track address of the track last played back;

a detection unit to detect overshoot of the track last played back by comparing the present address data played back from the laser and the track address stored in said memory unit, wherein said tracking control unit continuously causes the laser light to move towards the track last played back, according to an output from said detection unit, without a pause operation.

2. A method of playing back data stored on a disk, the data being recorded in a first group of data tracks and a second group of data tracks and existing in spiral form such that the first group of tracks and the second group of tracks exist with a mutual difference in level in a radial direction, comprising:

playing back the data stored on the disk;

rotating the disk while playing back the data;

causing the laser to follow the first group of tracks or the second group of tracks;

storing a track address of the track last played back;

detecting overshoot of the track last played back by comparing the present address data played back from the laser and the track address stored in said memory unit, wherein said causing step continuously causes the laser light to move towards the track last played back, according to the overshoot detected in said detecting step without a pause operation.

3. A data playback device to playback data stored on a disk, the data being recorded in a first group of data tracks and a second group of data tracks and existing in spiral form such that the first group of tracks and the second group of tracks exist with a mutual difference in level in a radial direction, comprising:

a laser to playback the data stored on the disk;

a rotary device to rotate the disk;

a tracking control unit to cause the laser to follow the first group of tracks or the second group of tracks;

a memory unit to store a track address of the track last played back;

a detection unit to detect overshoot of the track last played back by comparing the present address data played back from the laser and the track address stored in said memory unit, wherein said tracking control unit continuously causes the laser light to move towards the track last played back, according to an output from said detection unit, until next readout instructions are sent from a host computer.

4. A method of playing back data stored on a disk, the data being recorded in a first group of data tracks and a second group of data tracks and existing in spiral form such that the first group of tracks and the second group of tracks exist with a mutual difference in level in a radial direction, comprising:

playing back the data stored on the disk;

rotating the disk while playing back the data;

causing the laser to follow the first group of tracks or the second group of tracks;

storing a track address of the track last played back;

detecting overshoot of the track last played back by comparing the present address data played back from the laser and the stored track address, wherein said causing step continuously causes the laser light to move towards the track last played back, according to the overshoot detected in said detecting step until next readout instructions are received from a host computer.

* * * * *

UNITED STATES PATENT AND TRADEMARK OFFICE
CERTIFICATE OF CORRECTION

PATENT NO.: 5,991,243
DATED : November 23, 1999
INVENTOR(S): Yuwa ISHII, et al.

It is certified that error appears in the above-identified patent and that said Letters Patent is hereby corrected as shown below:

Title Page, [75] Inventors: change "Yuwa Ishi" to --Yuwa Ishii--.

Signed and Sealed this

Thirteenth Day of June, 2000

Attest:

Q. TODD DICKINSON

Attesting Officer     Director of Patents and Trademarks